(12) United States Patent
Streater

(10) Patent No.: US 6,195,128 B1
(45) Date of Patent: Feb. 27, 2001

(54) VIDEO PROCESSING FOR STORAGE OR TRANSMISSION

(75) Inventor: Stephen B Streater, London (GB)

(73) Assignee: Eidos Technologies Limited, London (GB)

(*) Notice: Subject to any disclaimer, the term of this patent is extended or adjusted under 35 U.S.C. 154(b) by 0 days.

(21) Appl. No.: 09/011,973

(22) PCT Filed: Aug. 23, 1996

(86) PCT No.: PCT/GB96/02080

§ 371 Date: Feb. 23, 1998

§ 102(e) Date: Feb. 23, 1998

(87) PCT Pub. No.: WO97/08899

PCT Pub. Date: Mar. 6, 1997

(30) Foreign Application Priority Data

Aug. 25, 1995 (GB) .................................................. 9517436

(51) Int. Cl.[7] .................................................. H04N 7/32
(52) U.S. Cl. .................. 348/415; 348/398; 348/396; 348/390; 348/607; 382/275; 382/237
(58) Field of Search .................................. 348/627, 398, 348/396, 390, 384, 415, 416, 409, 402, 401, 400, 606, 607, 608, 624; 382/275, 237; H04N 7/32, 7/64

(56) References Cited

U.S. PATENT DOCUMENTS

| | | | |
|---|---|---|---|
| 4,807,033 | * | 2/1989 | Keesen et al. ........................ 358/167 |
| 4,847,677 | * | 7/1989 | Music et al. ........................... 358/13 |
| 4,903,124 | * | 2/1990 | Hoshi et al. ........................... 358/133 |
| 4,914,508 | * | 4/1990 | Music et al. ........................... 358/13 |
| 5,008,748 | * | 4/1991 | Carr et al. ............................. 358/136 |
| 5,060,285 | * | 10/1991 | Dixit et al. ............................. 382/56 |
| 5,260,781 | * | 11/1993 | Soloff et al. .......................... 358/133 |
| 5,428,403 | * | 6/1995 | Andrew et al. ...................... 348/402 |
| 5,519,790 | * | 5/1996 | Manning .............................. 348/415 |
| 5,610,659 | * | 3/1997 | Maturi et al. ........................ 348/396 |
| 5,633,684 | * | 5/1997 | Teranishi et al. .................... 348/398 |
| 5,731,840 | * | 3/1998 | Kikuchi et al. ...................... 348/416 |
| 5,781,196 | * | 7/1998 | Streater ................................ 348/428 |
| 5,831,677 | * | 11/1998 | Streater ................................ 348/415 |

FOREIGN PATENT DOCUMENTS

| | | |
|---|---|---|
| 313 301 | 4/1989 | (EP) . |
| 594 338 | 4/1994 | (EP) . |
| 606 675 | 7/1994 | (EP) . |
| WO 86/03922 | 7/1986 | (WO) . |
| WO 87/03768 | 6/1987 | (WO) . |
| WO 94/14139 | 6/1994 | (WO) . |
| WO 95/16325 | 6/1995 | (WO) . |

* cited by examiner

Primary Examiner—John K. Peng
Assistant Examiner—Jean W. Désir
(74) Attorney, Agent, or Firm—Sughrue, Mion, Zinn, Macpeak & Seas, PLLC

(57) ABSTRACT

A method of processing digital video information in real time involves reading-in digital data representing pixels of successive video frames, e.g., from a digitizer. The pixel frame data is initially stored and subjected to an idealization treatment to choose and pre-select representative values for pixel characteristics which are then adopted in the further processing. The idealized frame data can then be subjected to compression by deriving further data representing blocks of pixels (mini-blocks) and blocks of mini-blocks (super-blocks) and by generating code words to describe the changes in the pixel data of successive frames. The compressed data is finally stored and/or transmitted.

19 Claims, 9 Drawing Sheets

De-noiser diagram:

Flow chart showing compression method in Type 102.

Mini- block ordering in an example 32 by 32 pixel image.

y pixel ▫ mini-block ▫ intermediate-block ☐ super-block ☐

Section of image showing y pixels, mini-blocks, intermediate blocks, super-blocks, and the relationships between them.

Section of image showing one possible ordering of mini-blocks within an example 32x32 pixel image Colour space diagram:

Luminace mini-block compression:

Original 2 by 2 block

Block uncompressed

Block converted to 2 Ys and flags

Block converted to Y pair and flags

Combined luminace and chrominance mini-block compression:
YUV combined into a single codeword

FIG 7.

Processing expanded image ready for display:

|   |   |   |   |   |   |
|---|---|---|---|---|---|
| a | a | b | b | c | c |
| a | a | b | b | c | c |
| d | d | e | e | f | f |
| d | d | e | e | f | f |
| g | g | h | h | i | i |
| g | g | h | h | i | i |

The largest structural components of codewords in variuos compression types.

Type 102: ⊞

Type 108:   Repeated and non repeated super blocks

Type 112:    Memory and Type 108 codewords

Type 116:    Lines and Type 108 codewords

Type 120:   Better chosen Type 108 codewords

Type 124:

Similar to type 108 structure with codewords local to each section of each video

VIDEO PROCESSING FOR STORAGE OR TRANSMISSION

This invention relates to a system for a method of processing digital video information in which inter alia video digital information is preferably read and captured in real time and then compressed. The invention also relates to a method of and system for decompressing and replaying such compressed video. The video can either be stored on a computer storage medium such as, but not be limited to, a CD-ROM, for future use or can be transmitted through a communications channel to a receiving station.

BACKGROUND

In WO95/16325 we described a method of processing digital video information and the present invention seeks to provide improvements of the method and techniques described in this publication.

WO94/14139 describes a method of reducing noise in digital video information which involves a frame-by-frame comparison of pixel values to find a key frame which is maintained until more than predetermined portion of the pixels have changed whereupon another frame becomes the key frame.

SUMMARY OF THE INVENTION

In one aspect of the invention there is provided a method of processing digital video information in an adapted format for transmission or storage, said method comprising:

reading digital data representing luminance and chrominance of individual picture elements (pixels) of a current video image frame as a series of binary coded words and idealising the data to reduce the affects of noise by evaluating at least preselected values of luminance of corresponding pixels over a number of frames which occur after said current frame to identify and choose the particular value which remains within a predetermined range of variations from the actual values of corresponding pixel luminance over the optimally greatest number of frames and which is not biased for several frames towards either one of the limits of the range for the optimally greatest number of frames to represent a fixed value of pixel luminance chosen for that optimal number of frames and where there is more than one particular luminance value thus chosen, further selecting the value which differs the least from the actual values of corresponding pixel luminance over the optimal number of frames following the current frame to represent the fixed value of luminance chosen for that optimal number of frames. These steps can be repeated for chrominance values and the evaluation and selection of both luminance and chrominance values can take place for further optional sets of frames. These fixed representation values can then be subjected to compression. Such a technique can involve deriving from the words representing pixel luminance and chrominance further words each describing first and second groups of pixels of which the first group is a block of 8×8 pixels and the second group is a block of 2×2 pixels derived from the first group, and each block of the second group is characterised as a single entity code word for further processing by averaging the chrominance values of all four pixels and by selecting just a pair of luminance values to represent all the four luminance values and by providing an indication of the particular luminance value to be adopted for each pixel. The invention also provides a method of processing digital video information in an adapted format for transmission or storage after compression; said method comprising:

reading digital data representing individual picture elements (pixels) of a video image frame as a series of binary coded words;

deriving from the words representing individual pixels further words each describing first and second blocks or groups of pixels of which the second group is a subset of the first group and includes a representation of the luminance of 2×2 pixel blocks in which a pair of luminance values is adopted together with an indication of which of these two values is to be chosen for each pixel;

comparing and evaluating the words of the second groups representing corresponding portions of one frame with another frame or other frames in a predetermined sequential order of the elements making up successive first groups to detect whether a significant change has occurred;

using the comparison to take the second group to represent all the individual pixels described by the group whenever the detected change is significant and using variable length code words to represent the number of consecutive components of the second groups without significant change;

wherein the comparing and evaluating step comprises initially ascertaining whether the indications have changed to signify that a significant change has occurred and if not then information is derived by combining the pairs of luminance values and processing such combined values to produce fresh code words including the respective differences between the maximum and minimum luminance values and combining the fresh code words with said indications to produce further code words which are then processed to produce said information which represents the significance of the difference between the luminance values in the 2×2 pixel blocks being compared and utilizing this information to decide whether the significance of the difference should be taken as a significant change.

As appears hereinafter, the derived code words can be subjected to various processes, to achieve compression, some of which are defined in the dependent claims. Identical code words within each first block can be positionally correlated with a mask and a common code word stored just once for each block. During subsequent decompression the data representing the second blocks of pixels can be decompressed by converting the single entity code words into respective RGB pairs suitable for creating a display on a screen, each RGB pair being determined by the corresponding pair of luminance values in the associated single entity code words together with said indication which is taken to specify which of the RGB values of the RGB pair is to be adopted for each pixel in the subsequent re-constituted 2×2 pixel block.

EXAMPLE APPLICATIONS

In the digital domain, any application which can make use of video will be enhanced by the ability to process compressed video. Efficient compression and decompression is important in a number of applications, for example those outlined hereunder. Provided below are some descriptions, by way of example only, of how the invention in some of its various forms could be applied.

PSTN Videophone

In one version the invention can be used to provide the video processing required for a videophone (video telephone) through PSTN (analogue) telephone lines. In this case, the video is compressed in real time for transmission. Because of the constraints on bandwidth, the quality is not expected to be very high. For example. 160*120 pixel resolution, 10 frames per second and 32 intensity levels would be one example of image quality, although colour is possible. At this frame rate, there is considerable processor time both to improve compression and playback. Typical data rates are between 9.6 kb/s and 30 kb/s. In this case, a hardware based solution such as H.320 would be uneconomical, and current widely owned standard alternatives cannot deliver the required compression rates.

ISDN Videophone

In another implementation, the invention can be used to produce higher quality images and higher frame rates than in the PSTN videophone. These pictures may include colour. Typical data rates are between 38.4 kb/s and 128 kb/s. Other solutions exist to this problem (for example H.261), but they are typically much more costly to implement.

Radio Communications

In a further implementation of the invention, data rates of around 256 kb/s could be transmitted by radio to a receiving station. Because the codec can be implemented in software on a low cost computer system, it is relatively straightforward to add extra features, such as error correction, which may be needed over a noisy radio link. The radio communications could be used, for example, for live news or live sport transmissions to an aircraft. Hardware based solutions would not prove as easy to maintain as this invention, as any changes to the specification of the equipment on the aeroplanes could lead to problems with approval on radio emissions.

Multimedia

In a further example of the invention, video data can be compressed and stored on to a computer disc, such as a CD-ROM, for playback in software or hardware on a microcomputer. In this case, data rates of up to about 2 Mb/s are acceptable, although the invention here may need as little as 400 kb/s at the required quality.

Computer Games

Video can be incorporated into games for example on CD-ROM. The efficiency of the algorithms lends itself to the sort of interactive video needed in computer games, as well as being useful for intro and outro sequences used at the beginnings and ends of games.

Off Line Video Editing

The invention allows the manipulation of large quantities of video data on a computer, and as such can be used for making a digital off line video editing system. In an off line system, the video quality does not have to be as high as broadcast quality, allowing lower data rates to be used. For the professional market, all frames must be captured (for example 25 frames per second in PAL and 30 frames per second in NTSC).

Corporate Videos

In another implementation, the invention allows videos of approximately VHS quality to be edited and shown on a microcomputer. This could be used, for example, to make corporate videos or promotional videos. The efficient compression of large quantities of video is vital in this case.

| GLOSSARY OF NOTATION | |
|---|---|
| % | a binary number follows |
| b | bit |
| B | byte |
| b/w | grey scale |
| col | colour |
| fps | frames per second |
| intermediate-block (ib) | a 4 × 4 block of pixels |
| lut | look up table |
| mini-block (mb) | a 2 × 2 block of pixels |
| Optima CIF | a spatial resolution of 368 × 272 pixels |
| PCQCIF | a spatial resolution of 160 × 120 pixels |
| PCHCIF | a spatial resolution of 320 × 120 pixels |
| PCCIF | a spatial resolution of 320 × 240 pixels |
| shape | a four bit number specifying whether each corner of a mini-block is nearer in intensity to the maximum or minimum value of intensity in the mini-block |
| super-block (sb) | an 8 × 8 block of pixels |

The invention may be understood more readily, and various other aspects and features of the invention may become apparent, from consideration of the following description and drawings representing preferred embodiments of the invention.

BRIEF DESCRIPTION OF THE DRAWINGS

FIG. 7 Decompressed image ready to be filtered for display.

Overview of the Video Processing System

One implementation in more detail

In this example, the video processing method can be described in several parts which can follow in sequence:

1 the source video data is captured in real time;

2 the captured image is processed in real time to remove noise artefacts and other undesirable material (this process is termed "idealisation");

3 the idealised image is compressing and stored in real time;

4 the real-time-compressed video is then retrieved from storage at a later time;

5 this data is further idealised;

6 this data is subjected to non-real time compression;

7 this data is then stored for future use or transmitted:

8 this data is then received or retrieved and subjected to decompression for playback.

Figure 1:
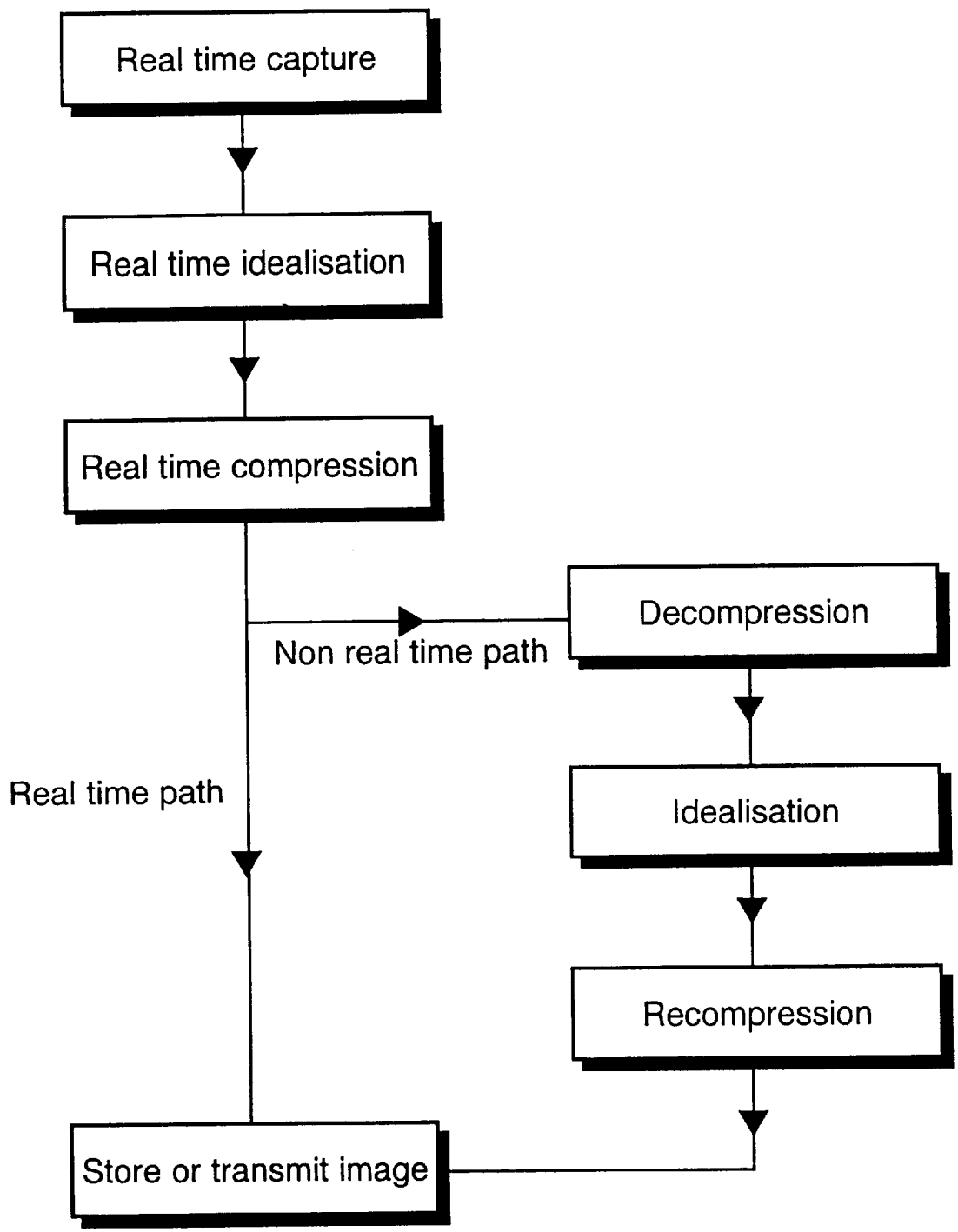
FIG. 1 The main subdivisions in the invention.

This process is summarised in FIG. 1.

Source Image Format

The following description, Y corresponds to the luminance component of video. U and V are the chrominance components.

Y, U, V, R, G and B are related by the following three equations:

$$Y=0.299R+0.587G+0.114B \quad\quad 1$$

$$U=B-Y \quad\quad 2$$

$$V=R-Y \quad\quad 3$$

In one application of the invention, the images being captured are all rectangular and the same size. The information about the video to be idealised is:

5 bits Y, for each pixel—which in one implementation is constructed by capturing the Y at 8 bits and taking the 5 most significant digits;

5 bits U for each 2*2 pixel block—which in one implementation is constructed by capturing the U at 8 bits for each pixel in the 2*2 block, averaging the four U values, and taking the nearest representable 5 bit value to the 10 bit average rounded to 5 bits;

5 bits V for each 2*2 pixel block—which in one implementation is constructed by capturing the V at 8 bits for each pixel in the 2*2 block, averaging the four V values, and taking the nearest representable 5 bit value to the 10 bit average rounded to 5 bits.

Other implementations may involve more bits per component, for example 6 bits of Y instead of 5.

Idealisation in Real Time Compression Version

Processing each video frame gives a version of the latest video frame which is best suited for compression. When the each frame is examined, it will typically differ from the previous frame. Many input devices, such as cameras, are analogue devices; if the source video is from such a device, many small changes in the apparent signal may be caused by noise, whereas large changes are more likely to be caused by genuine changes in the signal. However, consistent small changes are probably caused by a genuine small change in the signal.

The main purpose of the idealisation phase is to try to filter out the noise and keep the signal. A secondary purpose is to reduce the data rate needed for the compressed image, with minimum loss of quality.

In a typical implementation, each frame is treated in the same way as all other frames to prevent time dependent artefacts. Stored information about the past contains the value which would ideally have been used for this pixel, as well as some extra information about how this value was arrived at, including whether it is likely to be an overestimate or an underestimate of the true signal value, and how accurate it is likely to be.

In a typical implementation, small differences in the pixel value are borne in mind until they accumulate to make a significant change or a large change occurs. Some knowledge of the noise distribution helps in deciding how to allow for noise.

Idealisation of the Y Component in the Case of Real Time Compression

The compression system maintains an area of data with the same number of storage cells as there are pixels in each video frame. In one implementation of the invention (I2), each cell contains eight bits of information, representable as a binary number %hhhyyyyy, although the number of h bits and y bits can vary from one implementation to another.

In I2, the least significant five bits contain the current best estimate of what intensity should be compressed on this frame.

In I2, the most significant three bits contain historical information about previous frames. The special value %000 denotes the fact that the best possible representation of this pixel has changed since the last frame and must be updated on this frame. In this case, the least significant five bits of the internal byte contain the value which will form the basis of the value to which the intensity should be upgraded.

In I2, the 8 bits described above, containing historical information, are combined with the 5 bits of current frame intensity to provide a 13 bit number. Each 13 bit number is then processed to convert it to a new 8 bit number of the same format as the original 8 bit number mentioned above, which contains the idealised intensity for the current frame and three extra bits of information.

In I2, the luminance pixels are combined into 2 by 2 pixel mini-blocks, which are then coded as single entities. These mini-blocks correspond to the area covered by a single chrominance pixel.

In I2, conversion of the 13 bit number to a new 8 bit number is performed by use of a suitable look up table. Varying this look up table changes the effect of the program.

For example by changing its tolerance to noise, without having to change any of the code itself.

Figure 2:
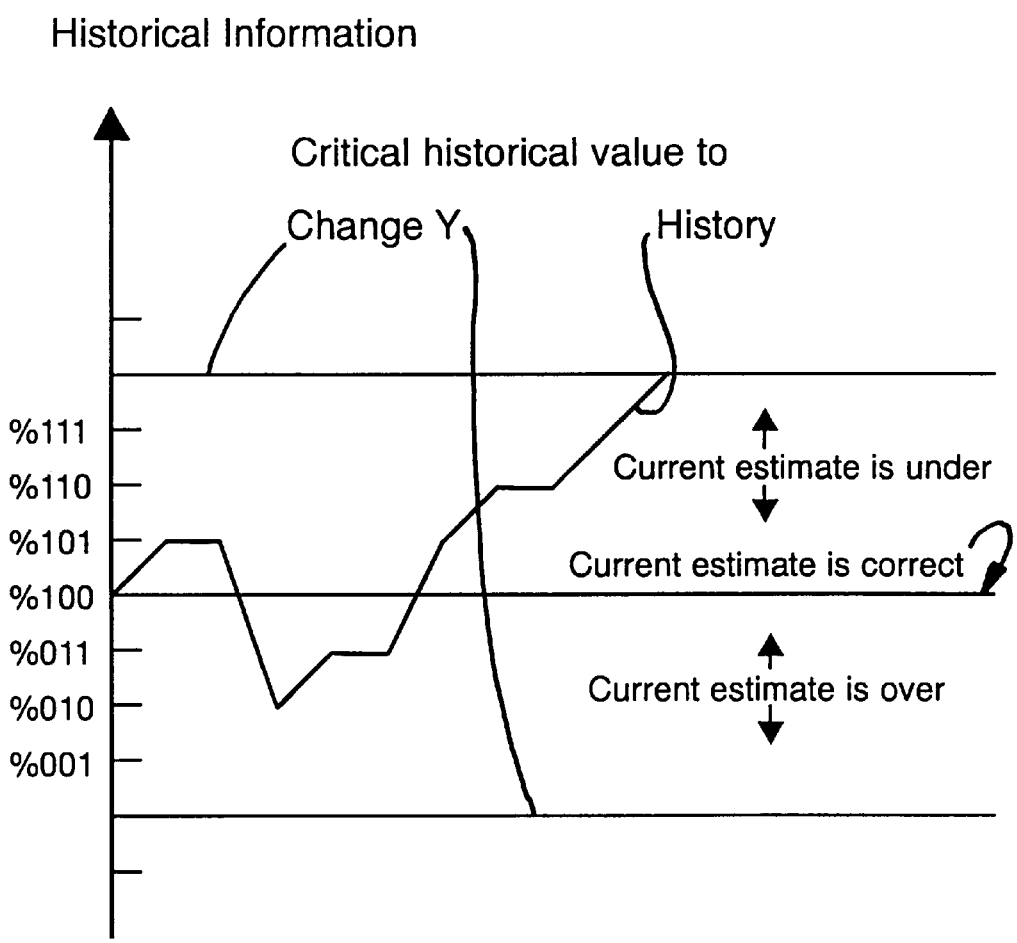
FIG. 2 An example of the Idealisation process.
Figure 3:
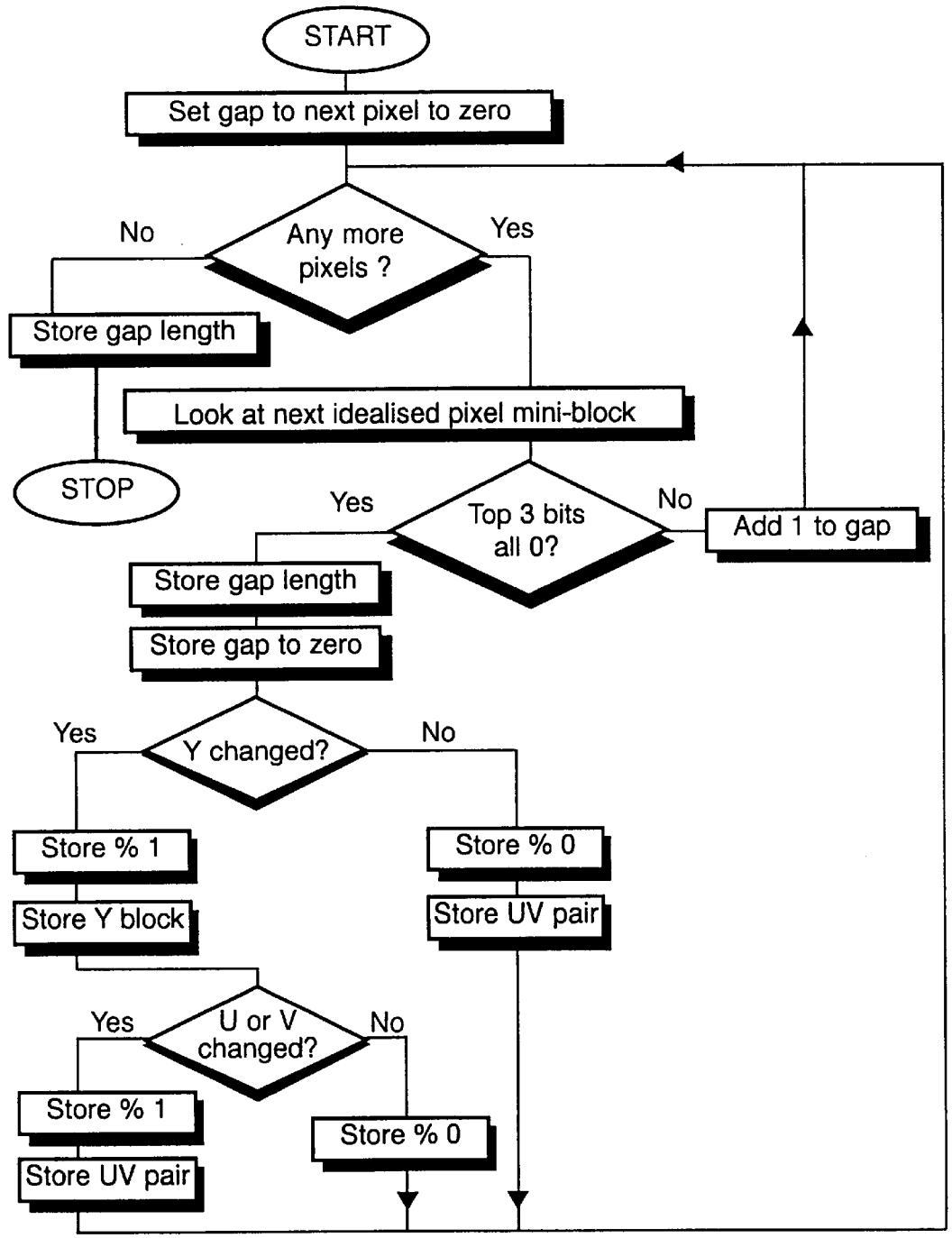
FIG. 3 Flow chart of one implementation of the Compression method.

See FIG. 2 for an example of how the historical information may vary with each frame.

In the paragraphs below, H_error is the accumulated significance of the error over previous frames, represented by the three bit number mentioned above. This is updated in one of a number of ways depending on the desired picture quality and data rate of the compressed images.

Below is an example of idealisation of real time system (high quality). The error between the previously idealised Y and the new captured Y is shown on the left, with the resultant effect on H_error shown on the right:

| | | |
|---|---|---|
| >+2 | -> | H_error = 0, update pixel |
| +2 | -> | H_error += 4 or other large positive change |
| +1 | -> | H_error += 1 or other small positive change |
| 0 | -> | H_error = unchanged |
| -1 | -> | H_error -= 1 or other small negative change |
| -2 | -> | H_error -= 4 or other large negative change |
| <-2 | -> | H_error = 0, update pixel |

U and V have similar process applied to them.

The videophone example (shown below) uses a similar method. It is more tolerant to noise, and has a lower data rate, but this is at the expense of quality. The error between the previously idealised Y and the new captured Y is shown on the left, with the resultant effect on H_error shown on the right:

| | | |
|---|---|---|
| >=+4 | -> | H_error = 0, update pixel |
| +3 | -> | H_error += 4 |
| +2 | -> | H_error += 1 |
| +1 | -> | H_error unchanged |
| 0 | -> | H_error = 0 |
| -1 | -> | H_error unchanged |
| -2 | -> | H_error -= 1 |
| -3 | -> | H_error -= 4 |
| <=-4 | -> | H_error = 0, update pixel |

Idealisation of the U and V Components

In I2, U and V are idealised in the same way as each other, and in a similar way to Y. Only historical information and information about the current frame is taken into account where compression is real time, as no future frames are available.

Idealisation in Non Real Time Compression Version

Changes are detected as soon as they occur, and updated at this point. Only future frames are examined.

The idea here is to update pixels as rarely as possible, thus improving the data rate, but also to spot changes as soon as they occur by using the information from multiple frames to distinguish the effects of signal and noise.

The values of Y, U and V with the longest match are used such that at no time does an error beyond a critical threshold occur, and average intensity error is as small as possible. If the current value is within the time span of this longest match, the pixel is not updated.

EXAMPLE APPLICATIONS

| Data rate Application | Approximate resolution |
|---|---|
| 14.4 kb/s PSTN videophone | PCQCIF b/w |
| Security systems | PCCIF b/w |
| 64kb/s ISDN videophone | PCQCIF col |
| 128kb/s ISDN video conferencing | QCIF col; 12 fps |
| 256kb/s Radio link | PCCIF |
| In Flight live transmission | PCHCIF or PCCIF |
| Defence applications | PCCIF or PCQCIF |
| 400kb/s Low bandwidth disc | PCQCIF, PCHCIF, PCCIF |
| 1.2Mb/s CD-ROM multimedia | PCCIF |
| 1.6Mb/s CD-ROM games | PCCIF; 15 fps |
| 2.0Mb/s CD-ROM videos | PCCIF; 24, 25 or 30 fps |
| 2.4Mb/s MO disc, Ethernet | Editing systems, Optima CIF |
| 10Mb/s Hard disc | >PCCIF - corporate videos |

Compression

This document covers various methods for compressing video for real time playback. All the formats below have the similar structure—based on that in FIG. 1.

The compression variants outlined below assume that the idealisation stage has already occurred.

For each frame format, there is a corresponding format with every part of the image updated to give key frames. In these cases, the bitstream for the compressed data is mostly unchanged from the corresponding non-key frame versions. The exception is that the bitstream representing the gaps between updated mini-blocks or super-blocks is absent but implicitly present as representing adjacent blocks. In the memory cases, the entire memory is cleared prior to storing the frame so that no prior knowledge of the video is needed in order to be able to decompress the video.

Several variants are outlined here under the headings Type 102, Type 108, Type 112, Type 116, Type 120, Type 124 and Videophone.

Compressing the Y Values

In one implementation of the invention, the 2*2 intensity blocks can be represented as follows: all four intensities the same=>use %000YYYY. Otherwise, x=minimum intensity, X=maximum intensity, use %pppyyyyYYYYY, where {x, X}={y, Y} and y=top left intensity of block, and bit set in ppp corresponds to which of y or Y to use at this position within the block. See FIG. 6 for more detail.

In a more sophisticated version, the mini-block representation %pppyyyyYYYYY is further compressed to %ppp-pxxxxxx i.e. the pair of luminance values is stored as a single entity. In another implementation, %pppyyyyYYYYY is further compressed to %ppp-pXXXXX for non-uniform blocks and %0000YYYY or %1111YYYY for uniform blocks.

Compressing the UV Values

U and V can be chosen from a subset of possible values, for example from one of 256 combinations. These codewords are chosen with a higher concentration of codewords near grey, where most pixel colours are in a typical video sequence, but some saturated colours are also represented.

Type 102 (Real Time)

Principles

As little of the image as possible is updated on each frame.

Changes at mini-block level are as efficient as possible given the time constraints.

Example Applications

Low cost home use/professional use video editing systems.

The image is constructed out of two by two pixel mini-blocks, each containing one chrominance value and 4 luminance values. The luminance for each mini-block is stored as YYYYYyyyyyfff. The chrominance for each mini-block is stored as CCCCCCCC with a higher concentration of colours near grey.

Figure 4:
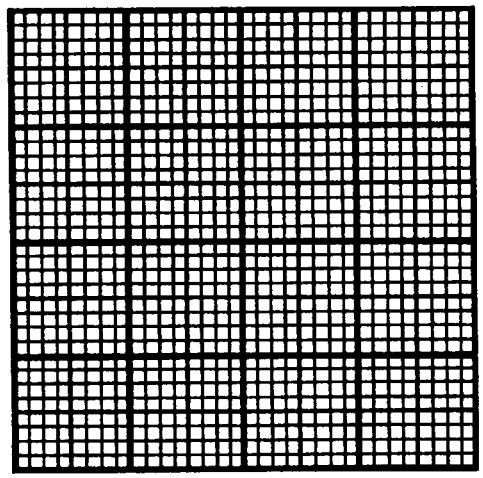
FIG. 4 Relationship between component building blocks of the image.
Figure 4:
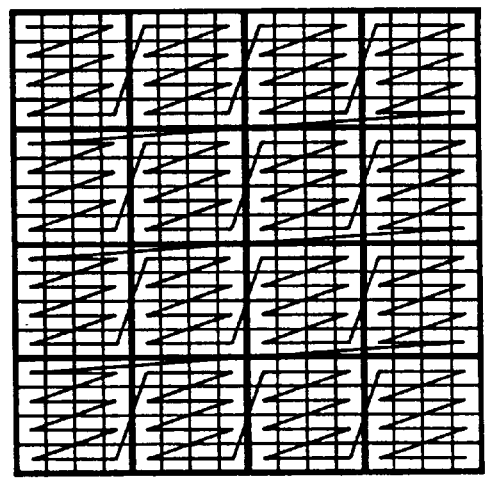
Figure 5:
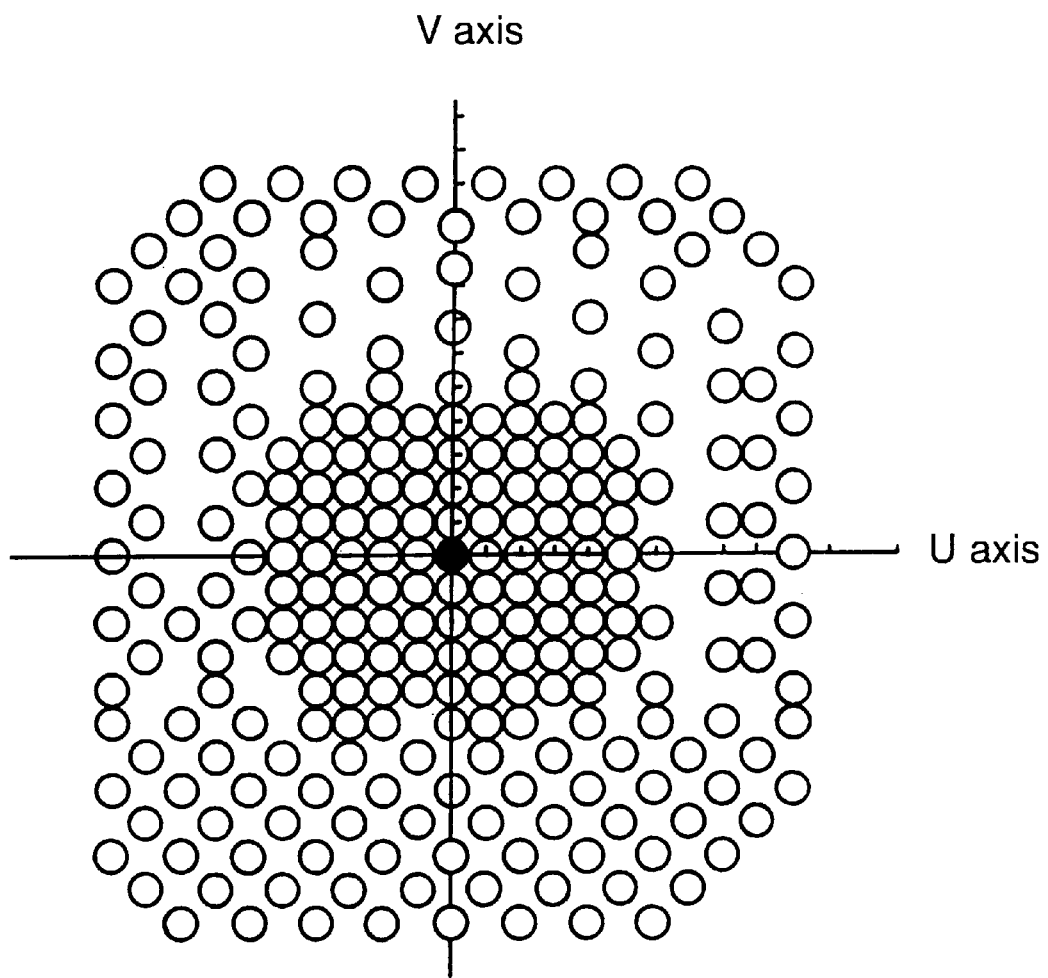
FIG. 5 Diagram showing one possible distribution of colour code words.

Only mini-blocks which have changed are included in the compressed bitstream. The gaps between updated mini-blocks consist of variable length code words. In one example, the order of the mini-blocks used to determine the gap size and the position of a mini-block at the end of the block is determined by the horizontal portions of the zig-zag line shown in FIG. 4. In a more general case, the lines follow a simple raster within each super-block, and the super-blocks rasterise as well within the image. The variable length codeword is represented by 1, 1+3, 1+3+7 or 1+3+7+15 bits as follows:

%0 corresponds to neighbouring blocks;

%1 %xxx (%xxx!=%111) corresponds to a gap of 1+%xxx;

%1 %111 %xxxxxxx (%xxxxxxx!=%1111111) corresponds to a gap of 1+7+%xxxxxxx;

%1 %111 %1111111 %xxxxxxxxxxxxxxx corresponds to a gap of 1+7+127+%xxxxxxxxxxxxxxx.

The bitstream format is as follows:

32 bits of compression type of 0x102

32 bits of frame length (in bytes)

repeat

{gap to next changed mini-block compressed mini-block or %000 5[y]

or %xxx 10[yY pair] where xxx represents the shape

} until the end of the image is passed word align

Type 108 (Non Real Time Compression)

Principles

Change as little of the image as possible.

Make each mini-block change as efficient as possible.

Make use of super-block level structure for repeated mini-blocks.

Example Applications

CD-ROM.

Figure 8:
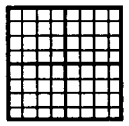
FIG. 8 Summary of the compression units in compression types 102, 108, 112 and 116.
Figure 8:
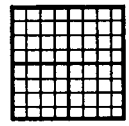
Figure 8:
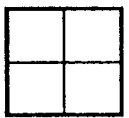
Figure 8:
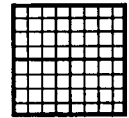
Figure 8:
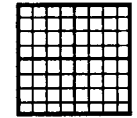
Figure 8:
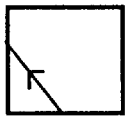
Figure 8:
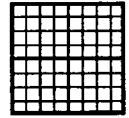
Figure 8:
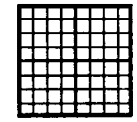
Figure 8:
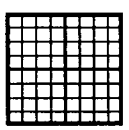
Figure 8:
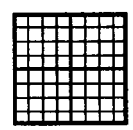
Figure 8:
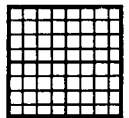
Figure 8:
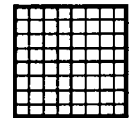

The image is made up of 8×8 super-blocks, each containing 16 2×2 mini-blocks. Each mini-block represents both four luminance pixels and one chrominance pixel. See FIG. 8. The mini-block luminance and chromninance are compressed together as a single codeword.

The luminance is represented by taking the maximum and minimum intensities in each mini-block, and choosing the closest one of these two to represent each of the four. Which of these two to choose is represented by four bits in the combined codewords called the "shape". In the case where the four luminance pixels are the same, a shorter codeword is used.

The chrominance is taken with higher concentrations near grey. The luminance and chrominance are combined into single codewords with shorter codewords for uniform mini-blocks near grey, and a higher density of codewords near grey.

The codewords can be thought of as an abstract representation of mini-blocks, including chrominance, luminance and shape information, and can be decompressed directly into RGB, YUV or other representation by the use of appropriate look up tables. YUV values which to not represent physically possible colours do not have codewords.

As mentioned earlier, the super-blocks are made of sixteen mini-blocks. Mini-blocks are stored if they have changed since the last frame. Mini-blocks with identical codewords which need updating at several places within the same super-block on the esame frame are, if they occur sufficiently often, stored in the bitstream first, followed by sixteen bits representing whether or not the repeated mini-block needs updating in the corresponding position in the super-block. When all these repeated mini-blocks are covered, other changed mini-blocks are represented as sixteen bits showing which mini-blocks have changed, and compressed mini-blocks for every remaining changed mini-block.

For frames which are not key frames, a gap length (in super-blocks), using a variable length codeword is used. This gap is 1+3+7+12 bits, though the length of the final component can depend on the image size.

gap uses a 1+3+7+11 variable length codeword (see Type 102) (measured in super-blocks)

mini-block is stored as YUVpppp as 8+4 or 14+4 bits, with uniform blocks near grey using the shorter codeword sb_level_data consists of the following components:
repeated mini-blocks if ≧3 identical short codewords or ≧2
identical long codewords appear, constructed as follows
%0
12 or 18 bits of compressed mini-block
16 bits specifying the update positions in the super-block
Repeat this as often as short codewords exist.

mb_level_data consists of the following components:
%1
16 bits specifying the update positions in the super-block
One mini-block codeword for each changed mini-block
%1 the bitstream for a compressed frame can be described as follows:
all frames are aligned to 32 bit boundaries
32 bits of frame type of 0x108
32 bits of frame length
while there are any changed super-blocks left to describe
{
  gap length to the next changed super-block
  sb_level_data
  mb_level_data
}

Type 112 (Non Real Time Compression)

Principles

Change as few pixels as possible.

Make mini-block changes as efficient as possible.

Use intermediate blocks where possible to represent common super-blocks.

Make use of previously used super-blocks in an efficient way.

Example Applications

CD-ROM.

Video on demand.

This is based on type 108. There are mini-blocks representing 2×2 blocks of pixels. There are super-block representing 8×8 blocks of pixels. See FIG. 8.

The mini-blocks are in the same format as type 108.

The super-blocks can make use of memory. Commonly occurring super-blocks are given codewords, so that when they occur in future, a relatively short codeword can be used to represent the 64 pixels in the super-block. Rather than trying to compare all super-blocks which have occurred with all super-blocks occurring on a new frame (a computationally very expensive task), only a subset of super-blocks can be represented. These super-blocks consist of four 4×4 intermediate-blocks with a single chrominance, and either one luminance value or two adjacent values. These codewords each have an associated codeword during compression saving whether or not this super-block has occurred before, and what codeword to use to represent it if it has.

Exact fits are not necessary in order to choose a codeword. The picture quality/compression rate can be varied by being more lenient about how good the fit is for the super-block.

When a super-block does occur which can be approximated by one of the possible codewords, this codeword is stored in a list at the start of the frame in which it first occurs. If it is element m in the list, it is given the codeword m. The number of bits which are used to represent codeword m depends on the number of codewords listed—the smallest length codeword to distinguish between all listed super-blocks is used. The list can be extended over a number of frames to make use of information remembered from previous frames. So the first codeword could be represented by a 0 bit codeword if no other super-block codewords are designed on this frame.

On playback, the super-blocks are dithered with random noise. This breaks up the edges of the intermediate blocks.

Type 112 bitstream frame_type 0x10C frame_length (32 bits)

then for each frame:

{
  define all unsaved short codewords
  for each super-block
  {
    store gap to this super-block 1+3+7+12 either
    either
    {
      store 112 super-block level data
      {
        %0
        short codewords
      }
    }

```
    }
or
{
    store 112 mini-block level data
    {
        %1
        same as type 108 mini-blocks
    }
}
}
``` store gap to end of frame
word align
super-blocks are Y, Y+1, UV with 5 bits each of Y,U,V
Use codewords from 0 bits upwards depending on the length.

Type 116
Principles
  Update as little of each frame as possible.
  Make mini-block changes as efficient as possible.
  Use a super-block based model to describe super-blocks if possible.
  Use minor changes to each super-block model instead of large changes where possible.
Possible Applications
  CD-RONM playback.
  Communications over low data rate lines.

Each super-block can be represented in one of two ways. The first is similar to type 108. There is, in addition, a model based representation of each super-block. This has two YUV values with a directed edge. See FIG. 8.

If the super-block can be represented using this model, then it is. Otherwise a type 108 super-block is used [see above].

If a type 108 super-block is used, only those mini-blocks which have changed in the last frame are stored (except in a key frame, when all mini-blocks are updated).

If a type 116 super-block is used, then the following approximations are examined until a fit which is good enough is found. The first approximation is to look at the same 116 super-block as was used on the previous frame. If this is good enough, then this value is used. In the case where this approximation is not sufficiently accurate, the best approximation where the two YUV values are preserved is examined—i.e. where an arbitrary line is chosen. If this approximation is not sufficiently accurate, then the best approximation with any values for (Y0, U0, V0) and (Y1, U1, V1) as well as any line. If this is not sufficiently accurate, a type 108 super-block is used.

If a type 116 super-block is used, the values for (Y,U,V) represent 6, 5 and 5 bits respectively. These are borrowed if possible from spatial or temporal neighbours.

Y, U and V values are chosen so that if a physical edge did exist between two objects, the YUV values would be an accurate reflection of the YUV values for the objects at points away from the edge. Antialiasing the edge on playback gives an accurate representation of the objects and the edge itself.

Between each super-block, a variable length gap is stored.
Bitstream format for type 116
Frame header 0x110
Frame length (32 bits)

For each frame

```
{
    case 0:
    {
        nothing
    }
    case 1:
    {
        gap to this sb
        new directed line number
    }
    case 2:
    {
        gap to this sb
        %0 is followed by the super-block codeword
        The super-block codeword is
        either
            %0 Y0 U0 V0 Y1 U1 V1 line
            1 6 5 5 6 5 5 10 bits
        or
            %1 line
            10 bits
            new colours and line number
    }
    case 3:
    {
        type 108 sb
        % 1 means use mini-block coding scheme
        16 bits saying which mini-blocks are to be upgraded
        the same number of short (4+8) or long (4+14) bit codewords as
        there are bits set
    }
}
gap to end of frame
word align
```

Borrow type 108 neighbours from above and the left where possible, with shorter codewords for exact matches and nearby YUV values.

Type 120 (Non Real Time Compression)
Principles
  Change as little of the image as possible.
  Make each mini-block change as efficient as possible.
  Make use of super-block level structure for repeated mini-blocks only have codewords which are visibly different.
  Make a format which is easy to compress further e.g. using type 124.
Example Applications
  CD-ROM.
  Video mail.

The image is made up of 8×8 super-blocks, each containing 16 2×2 mini-blocks. Each mini-block represents both four luminance pixels and one chrominance pixel. See FIG. 8. Each mini-block luminance and chrominance combination are compressed into a single codeword.

The luminance is represented by taking the maximum and minimum intensities in each mini-block and choosing the closest one of these two to represent each of the four luminance values in the mini-block.

The shape of these which has been chosen is represented by four bits in the combined codewords. The typical format for source data is 6 bits Y, with 5 bits each of U and V, which is slightly better resolution than can be displayed accurately on a 15 bit per pixel display. In the case where the four luminance values are the same, the decompression uses a dithered combination of pixels in the mini-block for playback in 15 bit per pixel graphics modes to simulate more than 15 bits per pixel display.

The chrominance is taken with higher concentrations near grey.

The nearest pair of luminance values to a set such as the following is chosen:

(0,0), (1,1), (2,2), (3,3), (4,4), (5,5), (6,6), (7,7), (8,8), (9,9), (10,10), (11,11), (12,12), (13,13), (14,14), (15, 15), (16,16), (17,17), (18,18), (19,19), (20,20), (21,21), (22,22), (23,23), (24,24), (25,25), (26,26), (27,27), (28, 28), (29,29), (30,30), (31,31), (32,32), (33,33), (34,34), (35,35), (36,36), (37,37), (38,38), (39,39), (40,40), (41, 41), (42,42), (43,43), (44,44), (45,45), (46,46), (47,47), (48,48), (49,49), (50,50), (51,51), (52,52), (53,53), (54, 54), (55,55), (56,56), (57,57), (58,58), (59,59), (60,60), (61,61), (62,62), (63,63); (1,5), (3,7), (5,9), (7,11), (9,13), (11,15), (13,17), (15,19), (17,21), (19,23), (21,25), (23,27), (25,29), (27,31), (29,33), (31,35), (33,37), (35, 39), (37,41), (39,43), (41,45), (43,47), (45,49), (47,51), (49,53), (51,55), (53,57), (55,59), (57,61), (59,63); (2,10), (6,14), (10,18), (14,22), (18,26), (22,30), (26, 34), (30,38), (34,42), (38,46), (42,50), (46,54), (50,58), (54,62); (4,20), (12,28), (20,36), (28,44), (36,52), (44, 60); (8,40), (24,56).

This set is carefully chosen to minimise the effect of noise on the edges in the original videos, as well as to allow a variety of edge codewords. The small number of codewords compared with the number of possible source codewords encourages fewer updates at the compression stage, shorter codewords and more repetition of codewords at a future compression stage.

The codewords can be thought of as an abstract representation of mini-blocks, and can be decompressed directly into RGB, YUV or other representation by the use of appropriate look up tables. YUV values which to not represent physically possible colours do not have codewords. The codewords represent mini-block luminance and chrominance.

As mentioned above, each super-block is made of sixteen mini-blocks. Mini-blocks are stored if they have changed since the last frame. Mini-blocks repeating more than twice are stored in the bitstream, followed by sixteen bits representing whether or not the repeated mini-block needs updating in the corresponding position. When all repeated mini-blocks are covered, the other changed miniblocks are represented as sixteen bits showing which mini-blocks have changed, and compressed mini-blocks for every remaining changed mini-block.

For frames which are not key frames, a gap length (in super-blocks), using a variable length codeword is used. This gap is 1+3+7+11 bits, though the length of the final component depends on the image size.

The bitstream format for type 120 is as follows:

```
{
  32 bits of compression type
  {
    0x114
  }
  32 bits of frame length (in bytes)
  for each super-block in the image
  {
    gap to next changed super-block (variable length codeword)
    {
      %0
      or %1 000 to %1 110
      or %1 111 7[0] to %1 1 111 1111110
      or %1 111 7[1] 11[0A1]
    }
```

-continued

```
  }
  compressed super-block
  {
    while (there are more mini-blocks repeated>twice)
    {
      %1
      mini-block
      {
        16 bits of all mbs of this type being updated
        mini-block codeword
        {
          4 bits shape, then 14 bits YUV
        }
      }
    }
    end of repeated mb section
    {
      %0
    }
    if (there are any more mbs to updated in this sb)
    {
      %1
      mini-block
      {
        16 bits showing all mbs left to be updated
        for each bit set
        {
          mini-block codeword
          {
            4 bits shape, then 14 bits YUV
          }
        }
      }
    }
  }
  Word align
}
```

All frames are word aligned.

Type 124 (Non Real Time Compression)
Principles
  Loss free compression.
  Super-block level structure for repeated mini-blocks.
  Fast playback on a variety of platforms at low data rate.
  An extension to any mini-block level compressed videos.
  Better handling of cases where mini-blocks to be updated are sparse.
Example Applications
  CD-ROM.
  Video mail.

The video frames are compressed first e.g. by using type 120.

The image is made up of 8×8 super-blocks, each containing 16 2×2 mini-blocks. Each mini-block represents both four luminance pixels and one chrominance pixel. See FIG. 8. The mini-block luminance and chrominance are compressed together as a single codeword.

The number of combined YUV+shape codewords is counted across the image as a whole and for each super-block. These results are then summed over a number of frames for example over 200 frames.

Codewords are divided into four types
  Short local codewords—those frequent mini-blocks whose meaning has a definition local to the super-block it is in.
  Short global codewords—those frequent codewords which have a codeword independent of position in the image.

Long global codewords—those codewords which occur at least twice in the video and are not short local or short global codewords. Long local codewords—those which occur exactly once in the video.

Every frame may have a new set of short local, short global and/or long local look up tables defined within it. This new definition will then apply until the next redefinition or the end of the video, whichever is sooner.

Where three or fewer mini-blocks are updated in a super-block, a sparse representation of the positions of these mini-blocks within the super-block may be used instead of a sixteen bit mask. This consists of a four bit number to specify which mini-block needs updating followed by one bit to say if this should be repeated. In one variant, the one bit is not used, and the lengths are additive. The mini-blocks are deemed to be over of the length adds up to 16. In this case, the number of bits used to specify the length is restricted at each stage to be the smallest number of bits which could be used to specify all remaining lengths.

The method by which the mini-block codewords which are recompressed using 124 are chosen does not affect 124, but having a more skew distribution tends to help the data rate of the final compressed video.

The codewords can be thought of as an abstract representation of shaped mini-blocks, and can be decompressed directly into four RGB pixels for display by the use of appropriate look up tables.

The bitstream format (which is word aligned) for type 124 follows:

```
32 bits of compression type
{
    0X 118 with optional flags for, inter alia:
        new short local luts;
        new short global luts;
        new long global luts;
        allow sparse mini-block representation on this frame;
        all deltas are from a black frame rather than the last.
}
32 bits of frame length (in bytes)
{
    new short local lut if required
    new short global lut if required
    new long global lut if required
}
for each super-block in the image
{
    gap to next changed super-block (variable length codeword)
    {
        %0
        or %1 000 to %1 110
        or %1 111 7[0] to %1 111 1111110
        or %1 111 7[1] 11[OA1]
    }
    compressed super-block
    {
        while (there are more mini-blocks repeated>twice)
        {
            %1
            mini-block
            {
                16 bit update mask or sparse coding
                mini-block codeword
                {
                    2 bit codeword type
                    codeword
                }
            }
        }
        end of repeated mb section
    }
    %0
```

```
-continued

{
    if (there are any more mbs to updated in this sb)
    {
        %0
        mini-block
        {
            16 update bits or sparse coding 1+n(4+1)
            for each bit set
            {
                mini-block codeword
                {
                    2 bit codeword type
                    codeword
                }
            }
        }
    }
}
```

Videophone

The Main Features of this Variation of the Invention

This invention exhibits the following features: real time digitising, real time compression, real time transmission, real time reception, real time decompression and/or storage, real time playback.

This is similar to Type 102, but the gaps between updated mini-blocks tend to be bigger, and the ideal image is not always coded exactly. This applies particularly when small changes occur.

A copy of what was sent is kept (and which may not be the same as the idealised image in this lossy case). The transmitted image is updated in areas where the error between the previous transmitted image and the current compressed frame is large and if there is enough spare bandwidth.

The cases given below refer only to the luminance component.

5 Bit Per Pixel Version—ISDN Video Phone

With 4 bits per pixel, the uncompressed mini-blocks is only 16 bits and can be used as the offset into a look up table which returns the compressed codeword. With 5 bits per pixel, the corresponding look up table is sixteen times larger, so the Ys are compressed into fewer bits, for example a five bit codeword representing the (minimum Y, maximum Y) pair, as well as a four bit shape value specifying whether to use the maximum or the minimum at each corner of the mini-block.

Figure 6:
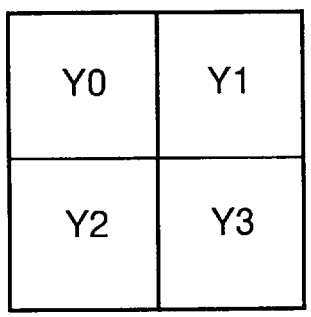
FIG. 6 Compression of luminance pixels into mini-blocks.
Figure 6:
Figure 6:
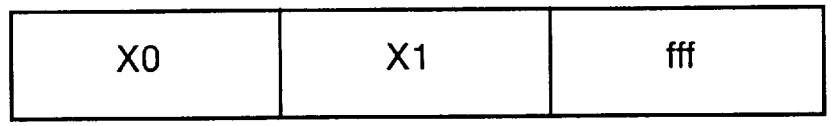
Figure 6:
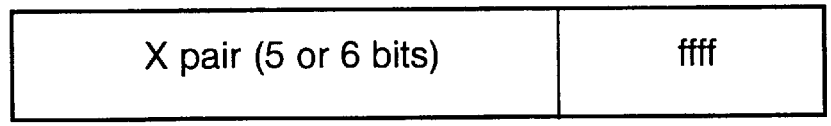
Figure 6:
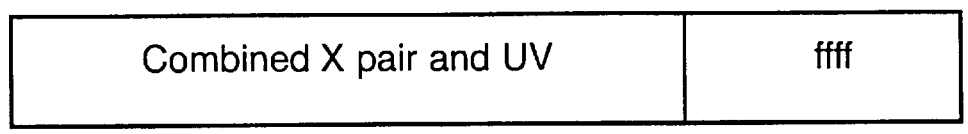

See FIG. 6.

The four Y pixels in a mini-block are approximated by either one intensity or two intensities (for example the maximum and minimum intensity) and the position of each pixel in the mini-block.

In one implementation, if four Ys in a mini-block are the same, the luminance block is compressed as %YYYYY0000. In this implementation, if the four Ys are not all the same, the compressed block contains a code word which consists of 4 bits to say whether to use the smaller or the larger of the two compressed Y values, for each of the four pixels in the mini block.

One possible list of non-uniform Y pairs used is listed below in order of their codeword numbers:

(0,2), (2,4), (4,6), (6,8), (8,10), (10,12), (12,14), (14,16), (16,18), (18,20), (20,22), (22,24), (24,26), (26,28), (28,30), (1,5), (3,7), (5,9), (7,11), (9,13), (11,15), (13,17), (15,19), (17,21), (19,23), (21,25), (23,27), (25,29), (27,31), (6,14), (10,18), (14,22).

When Y pair values are compressed which are not in the list, the nearest representation in the list is used.

Codewords for the mini-blocks are chosen to cover uniform blocks with the shortest codewords, and pairs representing close values being well represented (i.e. smooth areas) with some codewords for large differences between Ys (i.e. edges).

The Y pairs at 5 bits per Y component need 6 bits to represent the unordered pair. Video is captured in, for example, Y:U:V 5:5:5 or 6:5:5 format.

Luminance and chrominance are stored consecutively, with the entire luminance screen, then the entire chrominance screen.

Figure 9:
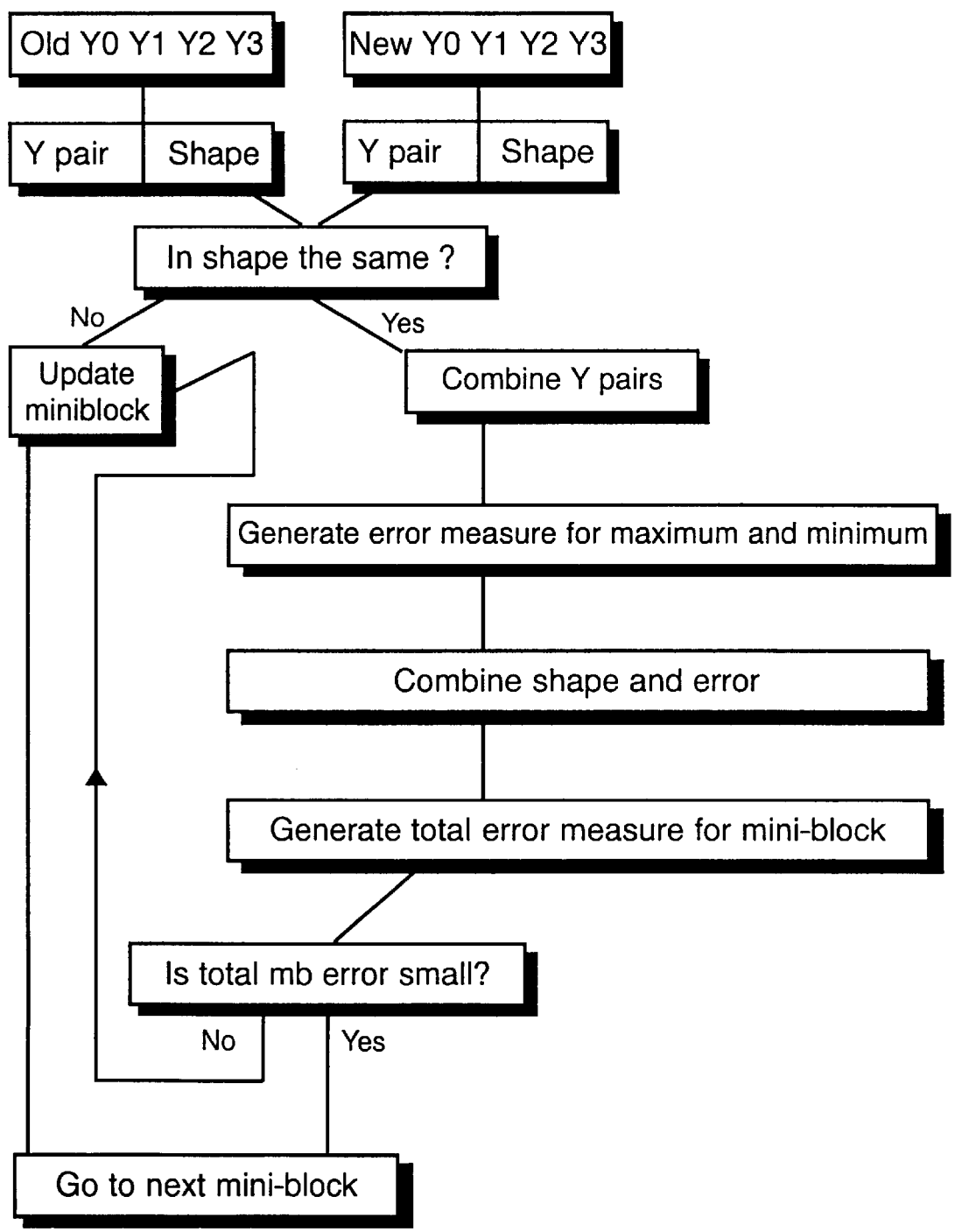
FIG. 9 Videophone processing path.

Compression gap starts at 0. Each mini-block is compressed, for example by means of a look up table, into a short compressed codeword, for example nine bits. If this is the same as the last compressed mini-block, gap is increased by 1. If the shape has changed, the mini-block is updated. Otherwise new_mb and old_mb are combined in an 18 bit codeword. Then a lookup table returns the error in the maximum and minimum values as two two bit numbers:

00 intensity is the same
01 intensity is slightly different
10 intensity is more than slightly different
11 intensity is completely different See FIG. 9 for a summary of how videophone data is chosen for compression. The mini-blocks are examined in the order shown in FIG. 4.

This is then combined with the shape in a further lookup table which combines the errors in the four pixels to decide whether or not to update the mini-block.

In one implementation, the length of gaps between updated mini-blocks can be represented among other ways, as follows: 2+7+13 bits, where the 13 bits only follows if the 7 bits are all 1s, and the 7 bits only follows if the 2 bits are all ones, and %00 on the 2 bits represents neighbouring blocks.

Memory

Learning

The information presented in this section is by way of example only.

Every frame, the entire compressed mini-block image is saved into screen memory location n, where:

$n=\min(((1<<H)-1,P)$ where P is first position with a 0 in the binary representation of the frame number; H is the number of bits needed to represent the history frame (typically three or four). Then when a block needs updating, the idealised block will be compared with the latest $2^H$ (for fixed H depending on the speed of the machines compressing and the compression rate required) cached super-blocks at this position as well as the previous frame, and the best super-block will be sent as well as the mini-block upgrades to this super-block. This allows the compression system to learn as it goes on what likely images will look like, thus increasing the quality and/or frame rate as time continues. Thus backgrounds and common foreground features are learned effectively. This idea is ideally suited to applications where the camera is stationary and the background changes relatively little, for example a videophone or security application.

The way in which the history frames are updated has the following advantages:

1) Representative frames from a wide range of timescales in the past are represented;
2) The playback machine can memorise images very efficiently -only one image needs to be stored each frame and this is in compressed format in contiguous memory locations;
3) Variable length codewords specifying which history entry to use all recent frames to have short codewords.

Increases in computer speed will automatically facilitate recalling more information during compression. In one implementation, the compression system remembers as many frames as it can recall, and recalls from the most recently stored until time runs out. An H bit codeword is used to specify which super block in memory is used. Most super-blocks will be updated from the latest frame, so in one possible implementation of the algorithm, the shorter code word %0 precedes such a super-block. If the super-block is to be based on a previously learned one, %1 is followed by an H bit number specifing which of the $2^H$ memories to use. Other systems are possible, depending on the distribution of memorised super-blocks.

The memories could be initialised to any values. In one implementation, each memory is initialised to a different shade of grey, the shades spread uniformly between black and white. In another implementation, the first $2^H$ transmitted frames are used as soon as they become available to initialise the history values.

In a situation such as an interview where the camera shots continually change back and forth in a single frame, this learning capability allows the changes to occur very efficiently compared with having to recompress the background. Similarly, in a videophone application, the background is memorised in the case where someone moves their head backwards and forwards. There may be 8 memorised options to choose from for each 8*8 super-block, which are upgraded independently across the image.

Every frame, both the transmitting and receiving components of the videophone make a record of the frame. This is stored in super-block format. There are a number of locations each of these frames can be stored. The nth frame is stored at the frame number corresponding to the highest bit number of the frame which has been updated when the frame was incremented. This has the effect of approximately doubling the spread between frames each time a memory further back in time is used. In one implementation, 16 possible frame memories are used, corresponding to frames which occurred up to 2^16 frames ago.

A four bit number in the compressed bit stream for each super-block shows which memory to base the super-block on. The bitstream then consists of a list of possible updates to this super-block in type 102 format or type 124 format.

This method then allows the compression end of the videophone to look back over more memory entries, until computer time runs out, making use of a faster computer at the transmitting end automatically. However much memory is looked at, the bit stream is still legal, and the playback end takes no more time if more memory is used. In fact, as each memory is likely to be a closer fit if more memory is allowed, the playback is likely to be less computationally intensive if the compression end is faster. Also, as a closer fit to each super-block is possible, the data rate for any given frame rate or spatial resolution is likely to be lower if more extensive use of memory is made. The super-blocks are stored as a collection of compressed mini-blocks.

There are several possible way a decision on which the best memory to use can be made. This first (which is the fastest at the compression end) is to count the number of changed mini-blocks and take the super-block with the fewest changes (or in the case of a tie, the most recent super-block frame with that many changes) and store the changed mini-blocks on top of this. The second (and more sophisticated) method is to use the same error finction as is normally used to determine whether or not to update the mini-blocks i.e. take the super-block which needs the fewest changes at the level of error acceptable at the current time. A third method, which is more time consuming, is to compare the filtered images (see later section on play back) resulting from each frame, and to compare these.

Chrominance

Chrominance is stored at lower resolution than luminance. The colour can either be stored as a separate image in 4*4 pixel blocks, or as two colours per super-block i.e. one on each side of a hypothetical object edge (cf Type 116).

In higher quality versions, the colour can be stored at a resolution of one colour per mini-block. Small changes in colour caused by noise can be stored as deltas from the previously transmitted colour.

Playback

When a picture is played back, the image size can be too small for comfortable viewing. The number of pixels on the display can be increased quite simply by replicating the pixels into 2 by 2 pixel blocks. However, this can lead to undesirable artefacts on the image.

In an improved version, the expanded image could be filtered as follows:

Perform a 3 by 3 filter of the luminance centered around each pixel. Although there are 9 pixels in the 3 by 3 square, there are a maximum of four different intensities. One of these occurs 4 times, two occur twice and one occurs once. (See FIG. 7). Thus a look up table containing a 4+4+4+4 or 5+5+5+5 bit address can be used to produce the filtered pixel.

One possible example of filtering which looks good is: median on low intensity variation systems, mean on high intensity areas (giving antialiasing effects).

See FIG. 7 showing expanded image ready for filtering.

In one implementation, only three of the four luminance values are used in the filtering—namely that which occurs 4 times and those which occur two times each. In the case where both the twice occurring pixels are the same, these are given more weight to reflect the fact that these are spatially nearer the implicit ninth element in the 3*3 square. The effect of this alternative is to reduce the lookup table size by 32 times in the 5 bit Y case, with almost no change in image quality. 13. A method according to claim 12, wherein there are additional groups of pixels as a subset of each block of 8×8 pixels each such additional group being composed of 4×4 pixels and the further coded words further signify which additional 4×4 pixel block contains any 2×2 pixel block which has changed and which particular 2×2 pixel block in any such additional 4×4 pixel block has changed.

What is claimed is:

1. A method of processing digital video information in an adapted format for transmission or storage after compression; said method comprising:

reading digital data representing individual picture elements (pixels) of a video image frame as a series of binary coded words;

deriving from the words representing individual pixels further words each describing first and second groups of pixels of which the second groups are contained in corresponding first groups and include representations of a luminance of 2×2 pixel blocks;

comparing and evaluating the words of the second groups representing corresponding portions of one frame with another frame or other frames in a predetermined sequential order of the elements making up successive first groups to detect whether significant change has occurred;

using the comparison to take the second group to represent all the individual pixels described by the first group whenever the detected change is significant and using variable length code words to represent a number of consecutive components of the second groups without significant change;

characterized in that each of the representations of the luminance of the 2×2 pixel block takes a form of a pair of luminance values and an indication as to which of these two values comprising the pair of luminance values is to be chosen and the comparing and evaluating step comprises ascertaining whether the indications have changed to signify that a significant change has occurred and if not then information is derived by combining the pairs of luminance values and processing such combined values to produce fresh code words including the respective differences between maximum and minimum luminance values and combining the fresh code words with said indications to produce further code words which are then processed to produce said information which represents the significance of the difference between the luminance values in the 2×2 pixel blocks being compared and utilizing this information to decide whether the significance of the difference should be taken as a significant change.

2. A method according to claim 1 and further comprising repeating the comparing and evaluating steps to establish fixed representative chrominance values.

3. A method according to claim 1 and further comprising adopting fixed representative values for pixel luminance or pixel luminance and chrominance for subsequent compression of the data.

4. A method according to claim 3, wherein the compression involves deriving from the words representing pixel luminance and chrominance further words each describing first and second groups of pixels of which the first group is a block of 8×8 pixels and the second group is a block of 2×2 pixels derived from the first group, and each block of the second group is characterized as a single entity code word for further processing by averaging the chrominance values of all four pixels and by selecting just a pair of luminance values to represent all the four luminance values and by providing an indication of the particular luminance value to be adopted for each pixel.

5. A method according to claim 4, wherein identical code words representing single entities within each of the first blocks are positionally correlated with a mask and a common code word is stored once for said first block.

6. A method according to claim 4, wherein the single entity code words are selected by subjecting actual luminance values of each second block of pixels to an evaluation technique to establish a pair of luminance values which are both within a range between the maximum and minimum values of all four pixels yet differ from one another to a maximum extent.

7. A method according to claim 4, wherein the single entity code words are selected by firstly creating a restricted set of pairs of luminance values chosen on the basis of largely excluding pairs of luminance values with relatively great differences and selecting the pairs of luminance values from the restricted set.

8. A method according to claim 7, wherein the single entity code words are selected by creating further sets of pairs of luminance values such that within each further set differences between each of the pairs of luminance values is constant and a difference between averages of adjacent pairs of luminance values is based on a difference between the luminance values and choosing representative pairs of luminance values from the sets thus created.

9. A method according to claim 4 and further comprising decompressing the data representing the second blocks of pixels by converting the single entity code words into respective RGB pairs suitable for creating a display on a screen, each RGB pair being determined by a corresponding pair of luminance values in the associated single entity code words together with said indication which is taken to specify which of the RGB values of the RGB pair is to be adopted for each pixel in the subsequent re-constructed 2×2 pixel block.

10. A method according to claim 9 wherein a case where the luminance values of any one pair of representative luminance values in any of the single entity code words are identical, the RGB pair is determined so that the average of the RGB pair is closely related to individual pixel luminance and chrominance values of the corresponding original 2×2 pixel block and an indication in the associated single entity code work induces the RGB values of the RGB pair thus determined to be dithered.

11. A method according to claim 4 and further comprising comparing and evaluating the single entity code words characterizing each block of the second group of pixels of a current frame with the corresponding second group of pixels of another frame or frames in a pre-determined sequential order to detect changes and producing further coded words each signifying whether such changes have been detected as well as which 2×2 pixel block or blocks in the 8×8 pixel block from which the 2×2 pixel block or blocks have been derived contains such a change.

12. A method according to claim 11 wherein there are additional groups of pixels as a subset of each block of 8×8 pixels each such additional group being composed of 4×4 pixels and the further coded words further signify which additional 4×4 pixel block contains any 2×2 pixel block which has changed and which particular 2×2 pixel block in any such additional 4×4 pixel block has changed.

13. A method according to claim 4, wherein the further words describing all the first groups of 8×8 pixel blocks differ from one another to only a small extent in a case where the associated 8×8 pixel blocks have similar pixel characteristics in corresponding pixel locations.

14. A method according to claim 3, wherein the compression involves deriving from the words representing pixel luminance and chrominance further words each describing first and second groups of pixels of which the first group is a block of 8×8 pixels and the second group is a block of 4×4 pixels derived from the first group and each block of the first group is characterized as a single entity code word for further processing by averaging the chrominance values of all sixty four pixels and by choosing a pair of adjacent luminance values closest to the mean of the luminance values of all sixty four pixels and each block of the second group is characterized as a single entity code word to further processing by adopting the same averaged value for the chrominance as that for the first group and by choosing one of the pair of adjacent luminance values to represent whole of the second group.

15. A method according to claim 3, wherein the compression involves deriving from words representing pixel luminance and chrominance further words each describing a first group composed of 8×8 pixels, ascertaining whether any of the further words can be reasonably defined by just a pair of respective chrominance and luminance values which describe all pixels of second and third groups of pixels, the second and third groups of pixels making up the associated first group and being separated by a transition or boundary which is linear or curvilinear and in such case adopting the pairs of chrominance and luminance values to represent the first group and producing an additional word to represent the transition or boundary.

16. A method according to claim 15 further comprising adopting the additional words associated with the first pixel blocks of a number of successive frames in combination with all the chrominance and luminance values of the pixels in the first group of some preceding frame to represent pixel characteristics for further processing.

17. A method according to claim 4 and further analyzing the single entity code word to determine a number of times each code word occurs for each of the first group of pixels over a number of succeeding frames as well as for the entire image frame image of these succeeding frames and assigning fresh code words based on this analysis.

18. A method according to claim 17 wherein the code words are sub-divided into several types including a first type in which each of the first pixel groups is associated with a fixed number of code words, a second type in which most frequently remaining code words have fixed bit length code words, a third type in which least frequently remaining code words which occur at least twice also have fixed bit length code words and a fourth type in which the code words occur just once.

19. A method according to claim 18 wherein a range of values for the fixed bit lengths of the code words are selected and tested and a shortest total accumulative fresh code word bit length is adopted.

* * * * *